(12) United States Patent
Pollack et al.

(10) Patent No.: US 6,434,492 B1
(45) Date of Patent: Aug. 13, 2002

(54) COMPUTER APPARATUS AND METHOD FOR ANALYZING STRUCTURAL STABILITY

(75) Inventors: Jordan B. Pollack, Sudbury; Pablo Funes, Somerville, both of MA (US)

(73) Assignee: Brandeis University, Waltham, MA (US)

( * ) Notice: Subject to any disclaimer, the term of this patent is extended or adjusted under 35 U.S.C. 154(b) by 0 days.

(21) Appl. No.: 09/271,602

(22) Filed: Mar. 17, 1999

Related U.S. Application Data (60) Provisional application No. 60/078,253, filed on Mar. 17, 1998.

(51) Int. Cl.$^7$ .................................................. G01L 5/00

(52) U.S. Cl. ................................. 702/41; 703/6; 703/7

(58) Field of Search ............................... 702/33–36, 35, 702/108, 41–43, 81–84, 113, 127, 182–184, FOR 123–FOR 126, FOR 134–FOR 135, FOR 137, FOR 141, FOR 170–FOR 171, 71; 703/1, 6, 7, 8; 324/76.13; 750/263

(56) References Cited

U.S. PATENT DOCUMENTS

| | | | | |
|---|---|---|---|---|
| 4,756,662 A | * | 7/1988 | Tanie et al. | 414/729 |
| 4,858,146 A | * | 8/1989 | Shebini | 703/1 |
| 4,964,060 A | * | 10/1990 | Hartsog | 703/1 |
| 5,812,432 A | * | 9/1998 | Takizawa et al. | 703/8 |
| 5,831,875 A | * | 11/1998 | Hirata et al. | 703/7 |
| 5,920,319 A | * | 6/1999 | Vining et al. | 345/420 |
| 5,956,500 A | * | 9/1999 | Shimmell | 703/7 |
| 6,134,860 A | * | 10/2000 | Pagano et al. | 52/745.1 |

FOREIGN PATENT DOCUMENTS

| | | |
|---|---|---|
| EP | 0397904 A1 | 5/1989 |

OTHER PUBLICATIONS

Zienkjewicz, O.C., *The Finite Element Method in Engineering Science*, McGraw–Hill, New York 3$^{rd}$ Ed., pp. 677–757 (1977).

Bently, P.J., Generic Evolutionary Design of Solid Objects using a Genetic Algorithm, Ph.D. thesis, Division of Computing and Control Systems, School of Engineering, The University of Huddersfield (1996).

Lund, H., "Evolving Robot Control Systems", In J.T. Alader (ed.) , Proceedings of INWGA, University of Vaasa, Vaasa (1995).

Floreano, D., et al., "Automatic Creation of an Autonomous Agent: Genetic Evolution of a Neural Network Driven Robot", *From Animals to Animats III.*, Cambridge, Ma, MIT Press (1994).

Chapman, C.D., et al., "Genetic Algorithms as an Approach to Configuration and Topology Design", *Advances in Design Automation*, 65 (1) : 485–498 (1993).

Sims, K., "Evolving Virtual Creatures", In Computer Graphics Proceedings, Annual Conference Series, (1994).

(List continued on next page.)

Primary Examiner—Marc S. Hoff
Assistant Examiner—Khoi Duong
(74) Attorney, Agent, or Firm—Hamilton, Brook, Smith & Reynolds, PC (57) ABSTRACT

A computer apparatus and method for generating structures and analyzing the stability of a structure formed from multiple predefined components represents the structure as a series of bodies fixed in place by stationary joints. The joints have known properties and each joint is assigned a torque capacity corresponding to the known properties. A computer routine calculates torque exerted on each joint and compares the calculated torque with the torque capacities to determine stability of the structure. The computer routine enables remodeling of an unstable structure.

29 Claims, 6 Drawing Sheets

OTHER PUBLICATIONS

Adeli, H., et al., "Fully Automated Design of Super–High–Rise Building Structures by a Hybrid AI Model on a Massively Parallel Machine", *AI Magazine*, 17 (3) :87–93 (1996).

Hurwitz, K., "Integrating 3D Solids in Design", *DesignNet*, 49–51 (1992).

Gardin, F., et al., "Analogical Representations of Naive Physics", *Artificial Intelligence*, 38:139–159 (1989).

Lund, H.H., et al., "Evolving Robot Morphology", Invited paper in Proceedings of IEEE Fourth International Conference on Evolutionary Computation, IEEE Press, N.J., (1997).

Lee, W., et al., "A Hybrid GP/GA Approach for Co–evolving Controllers and Robot Bodies to Achieve Fitness–Specified Tasks", In proceedings of IEEE $3^{rd}$ International Conference on Evolutionary Computation, IEEE Press (1996).

Matarić, et al., "Challenges in evolving controllers physical robots", *Robotics and Autonomous Systems*, 19:67–83 (1996).

Ngo, T.J., et al., "Spacetime Constraints Revisited", *In Computer Graphics*, Annual Conference Series, 335–342 (1993).

Webb, B., "Using robots to model animals: a cricket test", *Robotics and Autonomous Systems*, 16:117–134 (1995).

Leighton, T., et al., "Fast Approximation Algorithms for Multicommodity Flow Problems", *J. of Computer and Syst. Sciences* 50:228–243 (1995).

Smith, A., "A New Look for Solid Modeling", *Computer–Aided Engineering*, 19–24 (1996).

Cliff, D., et al., "Artificial Evolution of Visual Control Systems for Robots", To appear in *From Living Eyes to Seeing Machines*, Oxford University Press (1996).

Forbus, K.D., "Qualitative Process Theory", *Artificial Intelligence*, 24:85–168 (1984).

Shoenauer, M., "Shape Representations and Evolution Schemes", In L.J. Fogel, P.J. Angeline and T. Back, Editors, Proceedings of the $5^{th}$ Annual Conference on Evolutionary Programming, MIT Press, to appear (1996).

Cormen, T.H., et al., Introduction to Algorithms, MIT Press, McGraw Hill, pp. 579–629 (1989).

Iusem, A.N., et al., "Interval Underrelaxed Bregman's Method with an Application", *Optimization*, 35:227–250 (1995).

Maos, E., et al., "V–LAB: A Virtual Laboratory for Structural Integrity Assessment of Composite Components", *Applied Research Associates, Inc., Raleigh, N.C.* 39 pages (1996).

Angeline, P.J., et al., "Coevolving High–Level Representations", Proceedings of the Third Artificial Life Meeting, (1994).

Vatovec, M., et al., "Modeling of Metal–Plate–Connected Wood Truss Joints: Part II–Applications to Overall Truss Model", *American Society of Agricultural Engineers*, 40 (6) :1667–1675 (1997).

* cited by examiner

COMPUTER APPARATUS AND METHOD FOR ANALYZING STRUCTURAL STABILITY

RELATED APPLICATION

This application claims the benefit of U.S. Provisional Application No. 60/078,253, filed Mar. 17, 1998, the entire teachings of which are incorporated herein by reference.

GOVERNMENT SUPPORT

The invention was supported in whole or in part, by grant ONR-N00014-96-1-0416 from the Department of the Navy. The Government has certain rights in the invention.

BACKGROUND OF THE INVENTION

Computers are commonly employed in the analysis of structures. One widely used computer analysis method is known as finite element analysis. In finite element analysis, the user first generates a computerized drawing of a unitary structure to be analyzed. The computer then divides the drawing of the structure into a plurality of elements. Forces and stresses on each element of the structure are then calculated. If the stresses on the structure are found to exceed the strength of the material from which it is formed, the user must redesign the structure. Although finite element analysis is a useful tool in the design process, the user must perform all the design work.

SUMMARY OF THE INVENTION

The present invention is directed to a computer apparatus and method for generating and/or analyzing the stability of a structure where the structure is formed from multiple predefined discrete components fastened together, for example, a bridge, truss, crane, etc. The structure is represented, by a representing member, as a series of bodies fixed in place by stationary joints. The joints have known properties and are listed by a listing member. Each joint is assigned a torque capacity corresponding to the known properties by an assigning member. An analysis member calculates the torque exerted on each joint and compares the calculated torques with respective torque capacities of the joints to determine stability of the structure.

In preferred embodiments, the strength of the joints is lower than the strength of the bodies. In one preferred embodiment, the torque capacity for each joint is provided from a table containing torque capacities for known joint properties. In another preferred embodiment, the torque capacity for each joint is calculated. At least one of the bodies is fixed to the ground with at least one of the stationary joints. Parameters for the structure are entered with a user interface. The parameters define the structure either for analysis or for providing instructions to a generating member for generating a model of the structure. Multiple models of the structure may be generated until at least one of the models is determined to be stable. The calculated exerted torques are compared with the torque capacities along a first plane to analyze two dimensional stability of the structure and along a second plane orthogonal to the first plane to analyze three dimensional stability of the structure. Stability analysis results are provided through an output interface.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
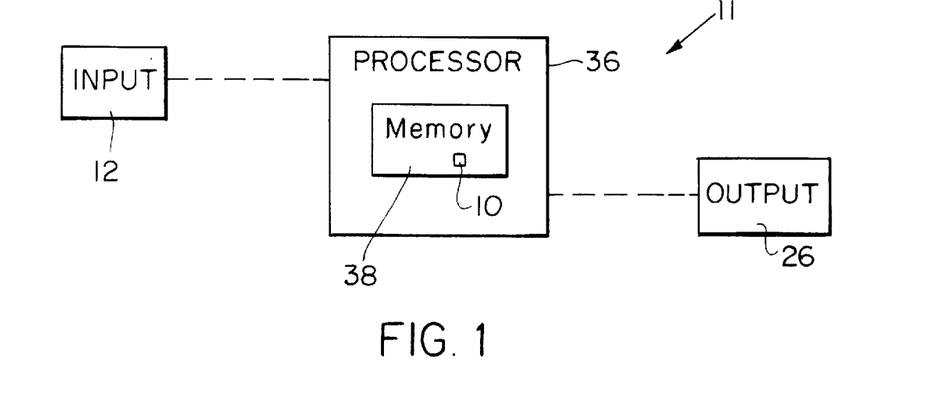
FIG. 1 is a schematic drawing of the present invention computer apparatus employed for generating and/or analyzing the stability of structures formed from multiple predefined components that are fastened together.
Figure 6:
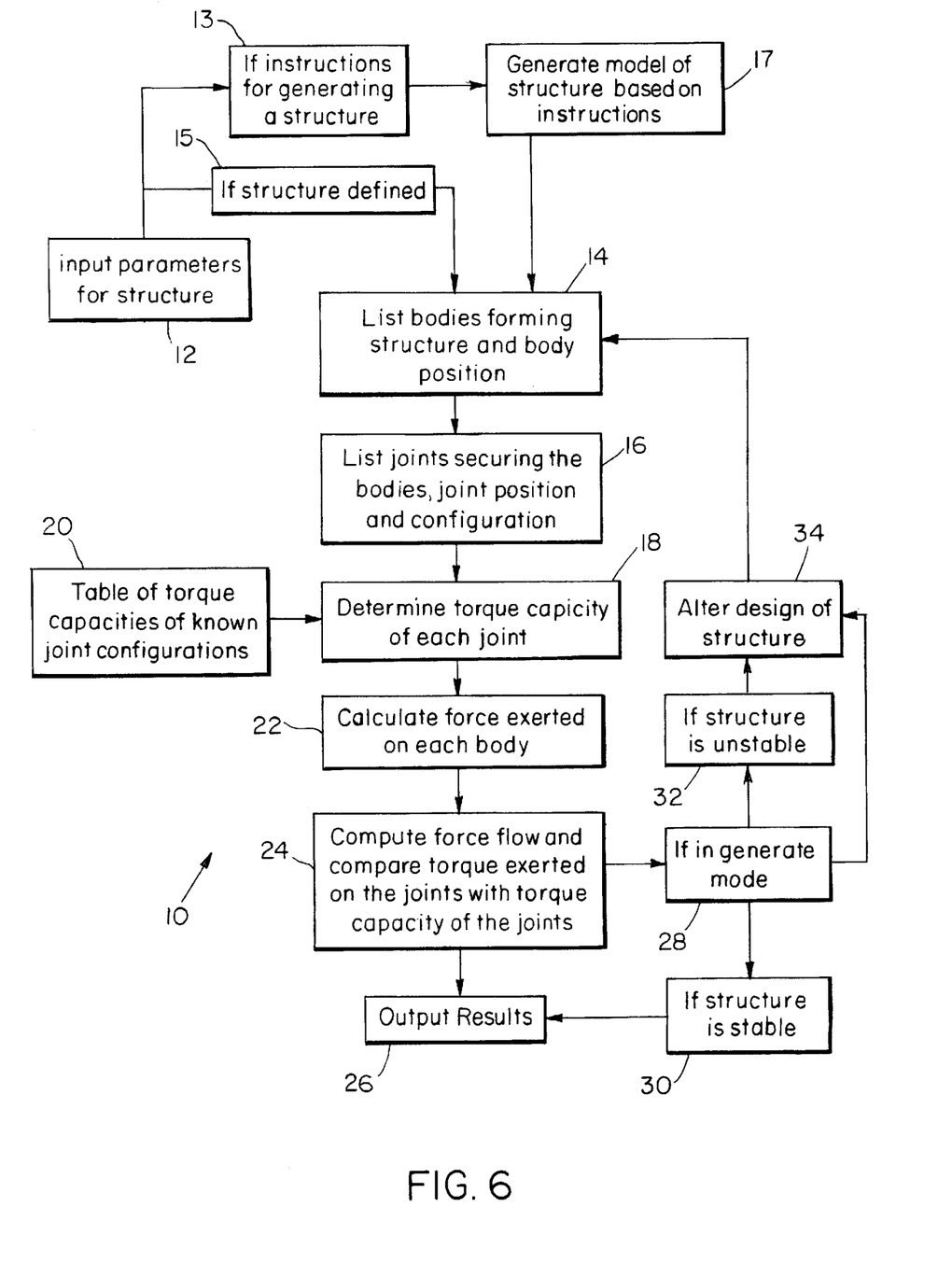
FIG. 6 is a flow chart of preferred steps that the apparatus of FIG. 1 performs for generating and/or analyzing the stability of structures formed from multiple components that are fastened together.

Referring to FIG. 1, the present invention generating/analyzing computer apparatus 11 is capable of generating and analyzing a model of a structure formed of multiple components that are fastened together. Examples of the components include plastic snap-on type bricks, pieces of wood that are nailed together, some types of stone or brickwork, magnetic blocks, etc., where the strength of the joint is less than the strength of the material from which the components are made. Apparatus 11 includes a computer processor 36 containing a working memory 38 for performing steps depicted in flow chart 10 (FIG. 6). An input interface 12 is connected to processor 36 for entering instructions or parameters defining a structure for generation and/or analysis. Input interface 12 may be, for example, a keyboard, a link to another processor, a drive for downloading information from storage media, etc. An output interface 26 is also connected to processor 36 for receiving analysis results. Output interface 26 may be, for example, a display screen, a printer, a link to another processor, a drive, etc.

In general terms, computer apparatus 11 analyzes multi-component structures on the assumption that the strength of each joint is less than the strength of each component. As a result, a multi-component structure is determined to be stable if torque forces at each joint of the structure are less than the torque capacity or strength of each joint since any failure is in the joints. The torque forces exerted on the joints are caused by the weight of the structure as well as external loads. Only torque forces at the joints are considered and any vertical pull or shear forces are disregarded.

Figure 2:
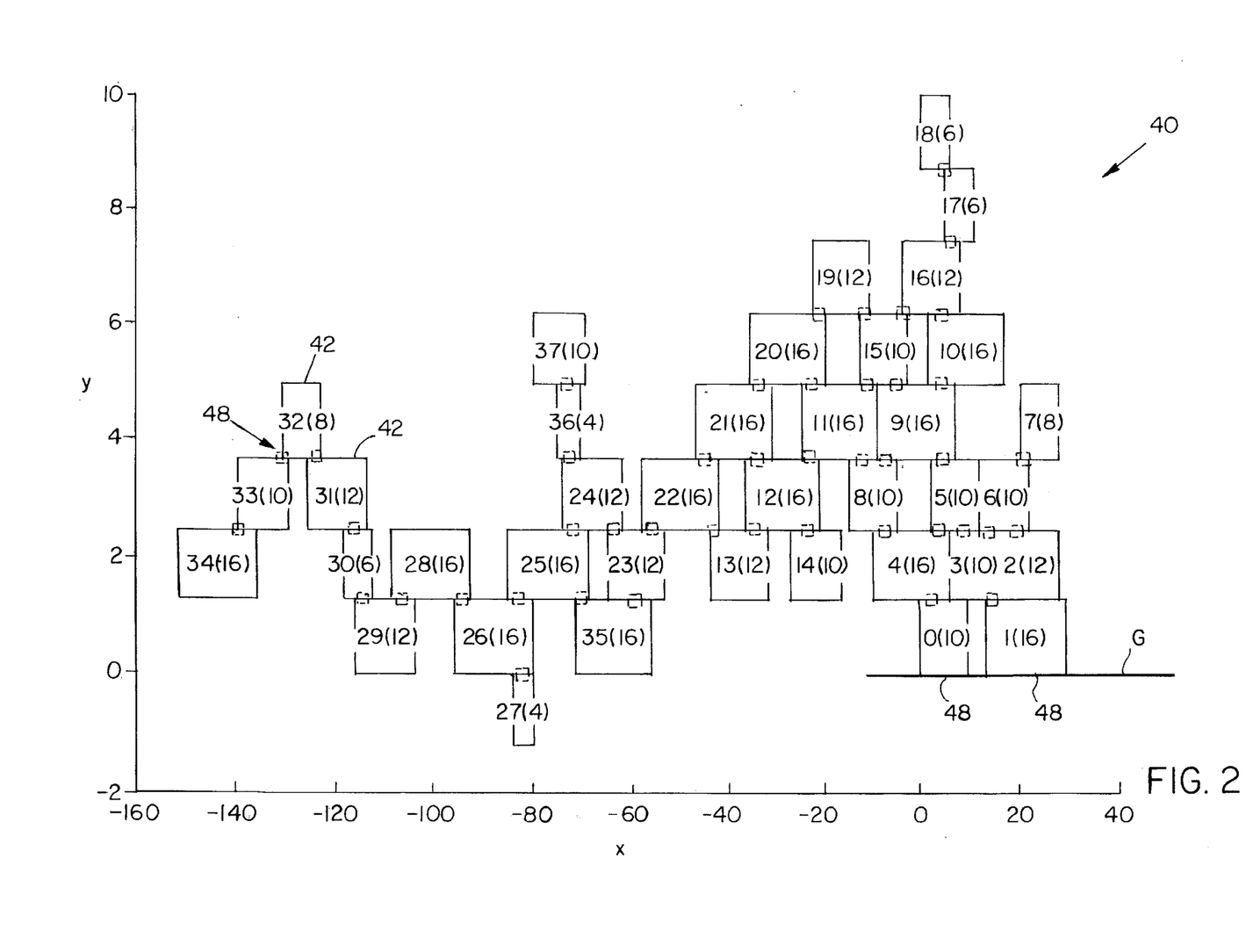
FIG. 2 is a schematic side view of a model of a structure formed from plastic snap-on type bricks, each brick being identified by a pair of numbers designating brick number and size.
Figure 3:
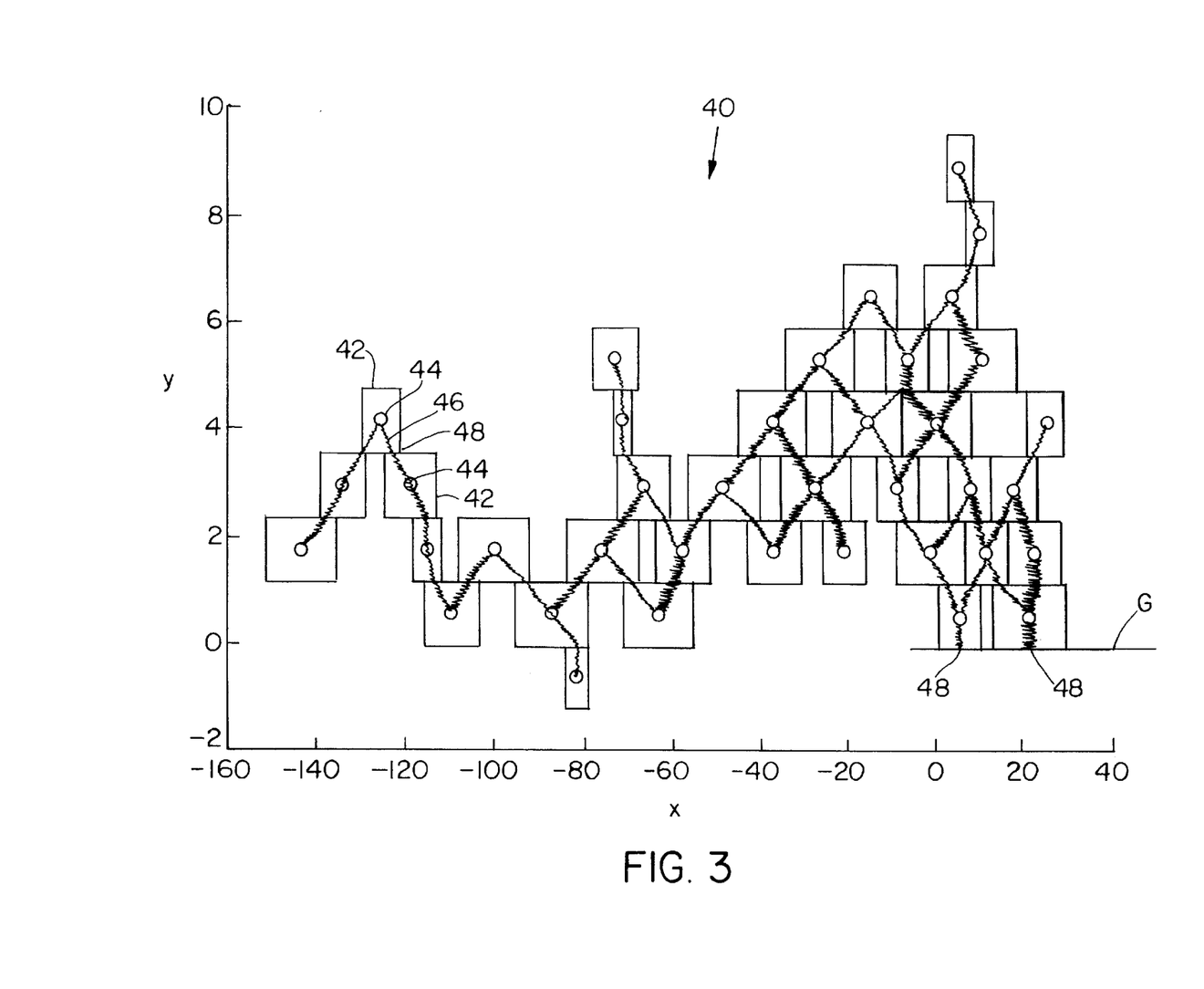
FIG. 3 is a schematic side view of the model of the structure of FIG. 2 depicting the location of the centers of gravity of the bricks and force flow.
Figure 4:
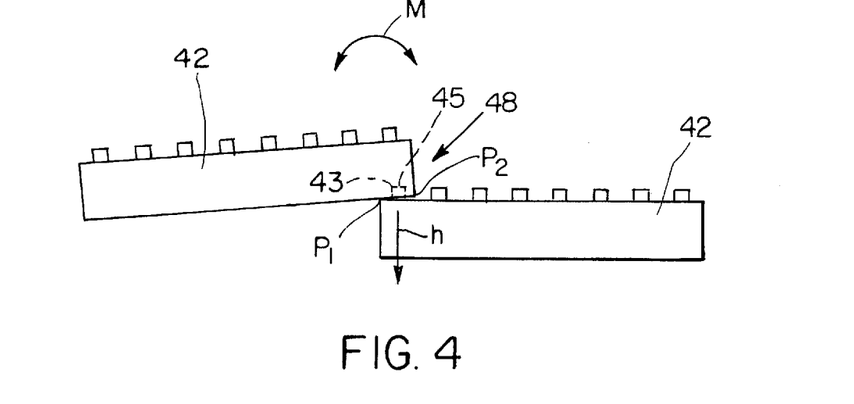
FIG. 4 is a side view of two plastic snap-on type bricks joined together by a single protrusion.
Figure 5:
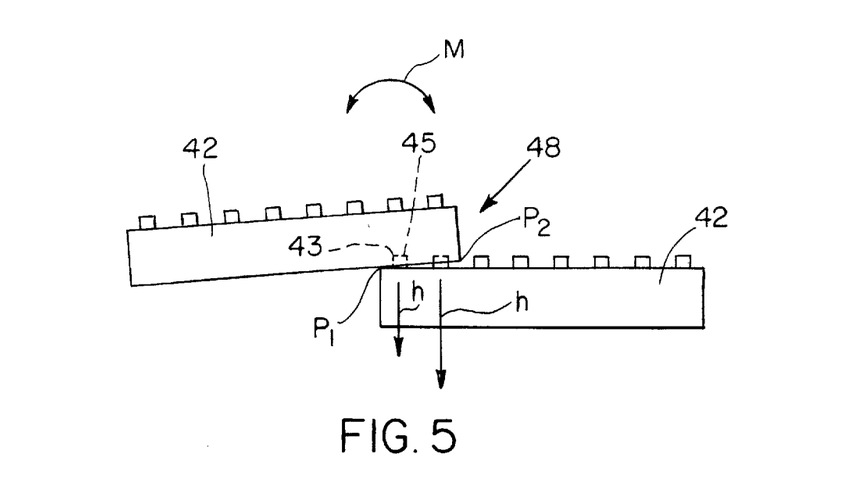
FIG. 5 is a side view of two plastic snap-on type bricks joined together by two protrusions.

An example of a type of structure capable of being generated and analyzed by apparatus 11 is depicted in FIGS. 2 and 3 where structure 40 is a computerized model of a bridge or truss type structure. Apparatus 11 can also analyze a previously designed structure as discussed later. The actual structure 40 is formed from a number of plastic snap-on type bricks 42 of a variety of standard sizes which are secured to each other at joints 48. The joints 48 consist of protrusions or knobs 43 engaged with mating sockets 45 (FIGS. 4 and 5).

Referring to flow chart 10 of FIG. 6, the operation of apparatus 11 (FIG. 1) in conducting a two dimensional generation and analysis of a structure will be described using structure 40 of FIG. 2 as an illustrative example. Instructions or parameters for generating a model of structure 40 are entered into apparatus 11 (FIG. 1) through input interface 12. Generally, such instructions specify the generation of a bridge-type structure spanning a particular distance and formed of plastic snap-on type bricks of various standard sizes. More limiting instructions such as the number of bricks, the height of the bridge, etc. can be given if desired. Query 13 asks if the instructions are for generating a structure and with the user-provided answer being yes, a structure representing member or model generating member 17 generates a model of structure 40 formed of multiple components 42 or bodies based on the instructions. Each body 42 of the model of structure 40 is assumed to be connected to adjoining bodies 42 by joints 48 (FIGS. 2 and 3). At least one body 42 is connected to the ground G by a joint 48. Once structure 40 is generated, a body listing member 14 (FIG. 6) makes a list of all the bodies 42 forming structure 40, the positions and the size of the bodies 42. The listed information of bodies 42 is depicted in FIG. 2. The bodies 42 are identified by numbers ranging from 0 to 37. The position of each body 42 is given by the position with respect to the x-y axes. The numbers in parentheses designate the size parameter of the body 42. For example, the designations 4, 6, 8, 10, 12 or 16 represent the number of locking knobs 43, thereby also identifying the size.

Continuing with FIG. 6, a joint listing member 16 then makes a list of all the joints 48 securing the bodies 42, the joint 48 position and configuration. This includes any joints 48 securing structure 40 to the ground G. Since the joints 48 are composed of known combinations of locking knobs 43 and sockets 45, each joint 48 is of a known predictable configuration so that the strength of each joint 48 is determinable. For example, FIGS. 4 and 5 depict a single knob/socket joint 48 and a double knob/socket joint 48, respectively.

Once the bodies 42 and joints 48 are listed, the strength or torque capacity of each joint 48 is assigned by assigning member 18 (FIG. 6). Referring to FIGS. 4 and 5, the torque capacity of a joint 48 is the ability of the holding forces h of the knobs 43 and sockets 45 to resist torque forces as indicated by arrows M about joint 48. The more knobs 43 and sockets 45 in a joint 48, the higher the torque capacity. The properties of each joint 48 are deductible from the configuration of the joint 48. By previously determining the joint 48 configurations between the bodies 42, for example, the number of knobs 43 and sockets 45, the joint torque capacity of each joint 48 is determined by correlating values of known torque capacities for known joint configurations from a table 20 and matching them with the listed joint 48 configurations. An example of a joint torque capacity table for plastic snap-on type bricks is given below.

TABLE 20

| Joint size (no. of knobs) | Approximate torque capacity (N-m × $10^{-6}$) |
| --- | --- |
| 1 | 10.4 |
| 2 | 50.2 |
| 3 | 89.6 |
| 4 | 157.3 |
| 5 | 281.6 |
| 6 | 339.2 |
| 7 | 364.6 |

It is apparent that torque capacity values would be different types of components connected or coupled by other types of joints, such as wood that is nailed together. However, the operating principle is the same in that properties of the joints are known in advance. In addition, in another preferred embodiment, torque capacity values for known joints can be calculated from a formula instead of being provided by a table.

The following is an example of a preferred computer method of listing the joints 48, the position of the joints 48, and determining the torque capacity or strength of the joints 48.

1. JOINTLIST=∅
2. For each unique pair (b,b') of bodies attached to each other.
3. Create Joint $J=J_{b,b'}$ with the following properties:
4. Position(J)=Center of area of contact between b and b'
5. Strength (J)=(obtained from Table 20)
6. Add J to JOINTLIST
7. For each body b that is attached to the ground
8. Create joint $T=J_{b,G}$ with the following properties:
9. Position (J)=Center of area of contact between b and the ground
10. Strength (J)=(obtained from Table 20)
11. Add J to JOINTLIST where:
   b and b' are bodies 42 attached to each other,
   G is the ground, and
   J is a joint 48 between the bodies 42 or between a body 42 and the ground G.

Each joint 48 is identified by the bodies 42 (b,b') associated therewith and the position of the joint 48 is at the center of the area of contact.

Next, referring back to FIG. 6, the force exerted on each body 42 is calculated by a calculating member 22. The weight of each body 42 is considered as well as any external forces or loads. The weight of a particular body 42 is determinable from the size parameter of the body 42. The center of each body 42 is assumed to be the center of mass and the gravitational forces acting on each body 42 are assumed to point downward. A preferred computer method of defining the forces exerted on the bodies 42 by position, vector (direction and magnitude) and target is set forth below as follows:

1. FORCELIST=∅
2. For each body b in the structure compute
3. Position (F)=center of b
4. Vector (F)=(0,−1) weight of b
5. Target (F)=b
6. Add F to FORCELIST 7. For each external force f acting on b
8. Create new F such that:
9. Position (F)=point of application of f
10. Vector (F)=vectorial representation of f
11. Target (F)=b
12. Add new F to FORCELIST where:
b is a body 42,
F is the force on each body 42, and
f is the external force acting on each body 42.

Structure 40 is stable only if all forces can flow down the network of bodies 42 to be absorbed by the ground G. The force flow lines 46 in FIGS. 2 and 3 indicate the flow of forces between the centers of gravity 44 of bodies 42 through joints 48 and to the ground G. This is represented, for each force F, by a flow $\phi_F$BODIES∪{G}→[−1,1] such that:

$$\phi_F(b,c)=\phi_F(c,b) \text{ for all } c,b \in \text{BODIES}\cup\{G\} \quad \text{(Eq. 1)}$$

$$\phi_F(b, \text{BODIES}\cup\{G\})=0 \text{ for all } b\in\text{BODIES}-\{\text{target}(F)\} \quad \text{(Eq. 2)}$$

$$\phi_F(\text{target}(F), \text{BODIES}\cup\{G\})=1 \quad \text{(Eq. 3)}$$

where:
F is force,
b is a body 42,
G is ground, and
c is the center 44 of each body 42.

Thus, $\phi_F$ constitutes a flow network where the flow only occurs at the joints 48:

$$\phi_F(b,c)=0 \text{ if neither } J_{b,c} \text{ nor } J_{c,b} \text{ exist in JOINTLIST} \quad \text{(Eq. 4)}$$

A flow $\phi_F$ indicates that the force or weight is supported throughout the structure. With the forces exerted on bodies 42 being known, the torque forces M (FIGS. 4 and 5) exerted on joints 48 are calculated by multiplying the forces exerted on bodies 42 with the appropriate moment arms. The moment arm is the distance between the application point of the force and the point of rotation at each joint 48. An analysis or prediction member 24 compares the torque capacities of joints 48 and the torque forces exerted on joints 48 as calculated by calculating member 22. Structure 40 will be considered to be stable if a force flow with a value of 1(Eq. 3) exists for each and every force such that the added torque for all force flows at every joint 48 with respect to the torque capacity or strength of every joint 48 is:

$$[\tau(J)] \leq \text{Strength (J)} \quad \text{(Eq. 5)}$$

where:
$\tau$=torque, and
J=joint 48.

The total torque $\tau$ at a joint 48 is defined by $$\tau(J_{b,b'}) = \sum_{F \in FORCELIST} \tau(J_{b,b'}, F)\phi_F(b, b') \quad \text{(Eq. 6)}$$

where $\tau$ $(J_{b,b'},F)$ is the torque exerted by a force of magnitude Vector (F) acting at Position (F) with axis of rotation located at Position $(J_{b,b'})$.

If a solution to this network exists, all the forces along the structure 40 are distributed. The operating principle of the present invention is that as long as the forces are distributed among the network of bodies 42 such that no joint 48 is stressed beyond its maximum capacity, structure 40 will not break.

A preferred computer method for computing force flow and comparing the torque or strength capacity (cap) of the joints 48 with the exerted torque is as follows:
1. Define TORQUE (J)=0 for all J∈JOINTLIST
2. For every F∈FORCELIST
3. For every joint J=$J_{b,b'}$define $$\text{cap}(b, b') = \text{MIN}\left\{\frac{\text{strength}(J) - \text{Torque}(J)}{\tau(J, F)}, 1\right\}$$

$$\text{cap}(b, b') = \text{MIN}\left\{\frac{\text{Strength}(J) + \text{Torque}(J)}{\tau(J, F)}, 1\right\}$$

6. Use a maximum flow algorithm to calculate a maximum flow $\phi_F$ from Target (F) to G as defined by Eqs. 1–4 and capacities as per cap just computed.
7. If the value of the resulting maximum flow $\phi_F$ is not one
8. Then exit returning FAIL; a solution was not found for the network of torque propagation
9. Else for every joint J=$J_{b,b'}$compute
10. TORQUE(J) TORQUE (J)+$\phi_F$(b,b')$\tau$(J,F)
11. Next F
12. Return SUCCEED; A solution exists.

With reference to FIG. 6, the results are then delivered to output interface 26 (for example, a printer or a display monitor). If the instructions input by the user are to generate a number of models of structures 40 or the model of structure 40 has failed, queries 32 and/or 28 will cause a redesigning member 34 to regenerate a revised design of the model of structure 40 which is then looped back to body listing member 14 for further analysis. If only the results of stable structures 40 wish to be viewed, the user may instruct query 30 to send the results of only stable structures 40 to output interface 26. Multiple models allow the user to choose between varying designs.

In addition to generating models of structures, apparatus 11 also analyzes structures that are already designed. Instead of generating a model of a structure, query 15 causes body listing member 14 to begin listing the bodies in the structure. Once the analysis is complete, instructions may be given to immediately send the results to output interface 26 or to generate additional models of the structure. Although flow chart 10 preferably calculates whether a stable solution exists for a structure, alternatively, values for the torque capacity of the joints and calculated torque forces exerted on the joints may be sent to output interface 26 for the user to analyze.

Figure 7:
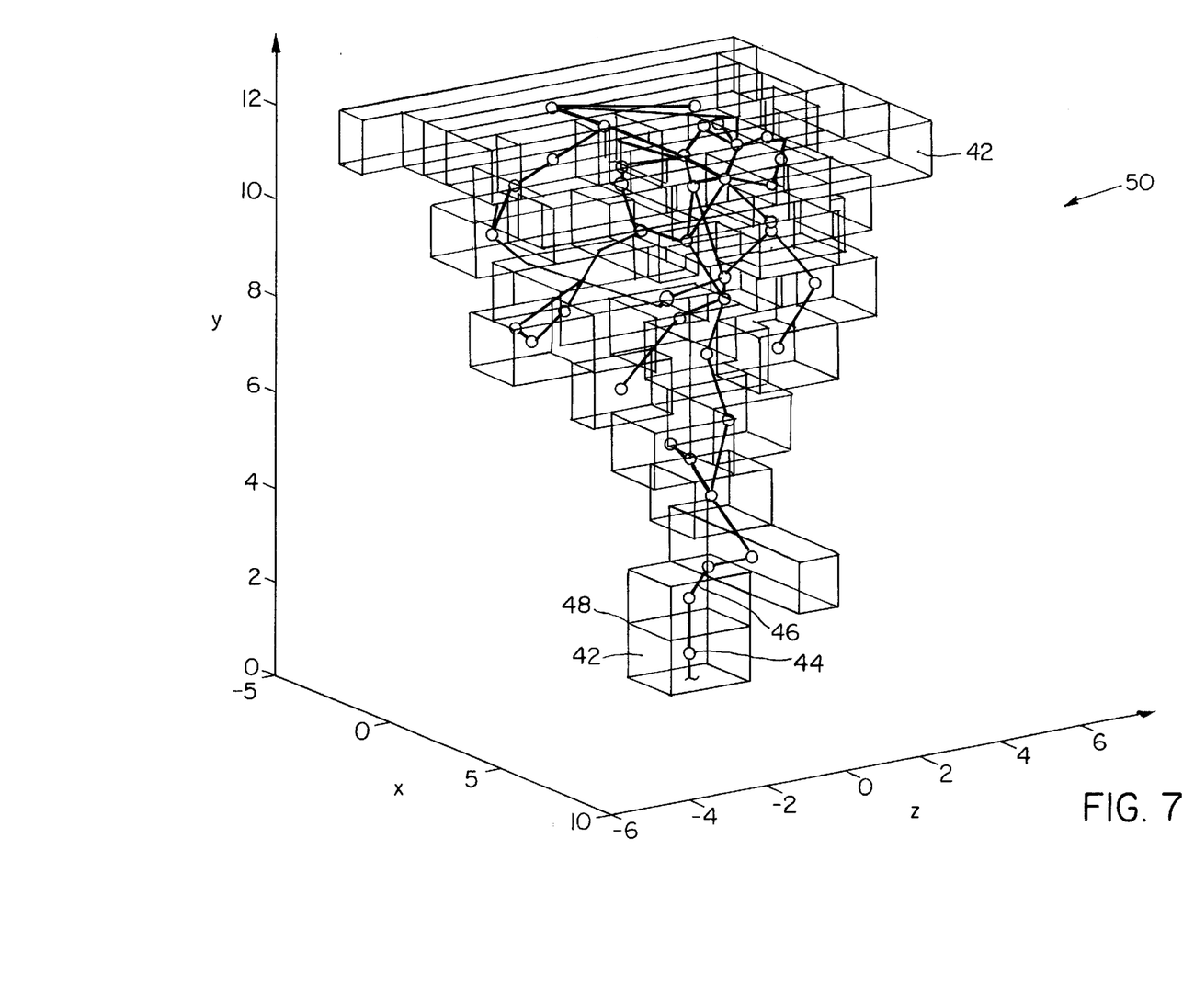
FIG. 7 is a perspective view of a model of a three-dimensional structure formed of plastic snap-on type bricks.
Figure 8:
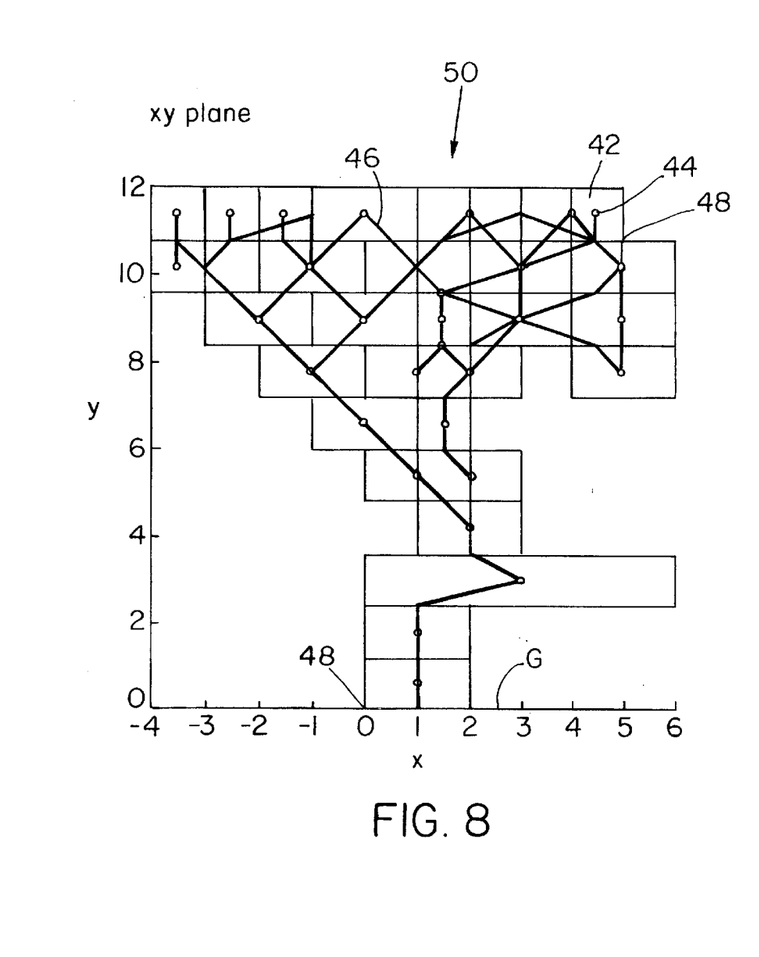
FIG. 8 is a front view of the model of the structure of FIG. 7.
Figure 9:
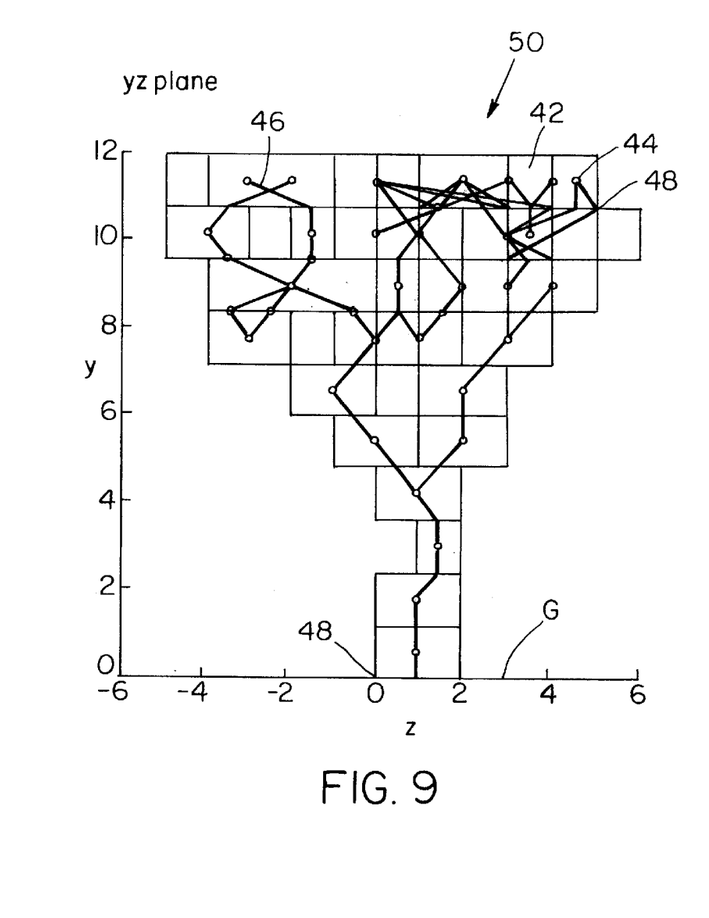
FIG. 9 is a side view of the model of the structure of FIG. 7.

When generating and/or analyzing three-dimensional structures, the invention analysis is preferably performed in two steps. A first analysis is conducted along a first two-dimensional plane such as described above, and then a second analysis is made along a second two-dimensional plane orthogonal to the first plane, in a similar manner, which results in a three-dimensional analysis. In a three-dimensional analysis, when a joint 48 has a multiple knob 43 length and width, for example, a 2×2 configuration, the torque capacity of joint 48 along each plane is increased by a factor equaling the number of rows. Referring to FIG. 7, structure 50 is a model of a three-dimensional structure formed of plastic snap-on type bricks 42. The analysis is first performed on the front view of structure 50 along the x-y plane as seen in FIG. 8 and then on the side view along the y-z orthogonal plane as seen in FIG. 9 to obtain a three-dimensional analysis.

While this invention has been particularly shown and described with references to preferred embodiments thereof, it will be understood by those skilled in the art that various changes in form and details may be made therein without departing from the spirit and scope of the invention as defined by the appended claims.

For example, although the structures are described as being secured to the ground, the structures can be secured to another structure or the analysis can be performed on a section of a structure. In addition, the analysis can be made for a structure having moving parts by modeling the structure as a stationary structure with the parts in different positions. Furthermore, although flow chart 10 depicts various steps for generating and analyzing structures, steps may be combined, added or deleted to suit particular circumstances.

What is claimed is:

1. In a computer system, a method of analyzing stability of a structure where the structure is formed from multiple predefined components fastened together, the method comprising the steps of:

representing the structure as a series of bodies fixed in place by stationary joints, the joints having known properties;

assigning to each joint a torque capacity corresponding to the known properties;

calculating an exerted torque on each joint; and comparing calculated exerted torques with the torque capacities to determine stability of the structure.

2. The method of claim 1 wherein the step of assigning further includes providing the torque capacity for each joint from a table containing torque capacities for known joint properties.

3. The method of claim 1 further comprising the step of fixing at least one of the bodies to ground with at least one of the stationary joints.

4. The method of claim 1 further comprising the step of using a user interface to provide parameters of the structure.

5. The method of claim 4 further comprising the step of generating a model of the structure based upon the parameters.

6. The method of claim 5 further comprising the step of generating multiple models of the structure until at least one of the models is determined to be stable.

7. The method of claim 1 further comprising the step of providing stability analysis results to an output interface.

8. The method of claim 1 further comprising the step of comparing the calculated exerted torques with the torque capacities along a first plane to analyze two dimensional stability of the structure.

9. The method of claim 8 further comprising the step of comparing calculated exerted torques with the torque capacities along a second plane orthogonal to the first plane to analyze three-dimensional stability of the structure.

10. The method of claim 1 in which the step of assigning further includes calculating the torque capacity for each joint.

11. The method of claim 1 in which bodies are stronger than the joints.

12. In a computer system, a method of modeling and analyzing stability of a structure where the structure is formed from multiple predefined components fastened together, the method comprising the steps of:

generating a model of the structure based upon parameters provided by a user;

representing the structure as a series of bodies fixed in place by stationary joints, the joints having known properties;

assigning to each joint a torque capacity corresponding to the known properties;

calculating an exerted torque on each joint;

comparing calculated exerted torques with the torque capacities to determine stability of the structure; and generating another model of the structure if the structure is determined to be unstable.

13. The method of claim 12 wherein the step of assigning further includes providing the torque capacity for each joint from a table containing torque capacities for known joint properties.

14. The method of claim 12 further comprising the step of fixing at least one of the bodies to ground with at least one of the stationary joints.

15. The method of claim 12 further comprising the step of using a user interface to provide parameters of the structure.

16. The method of claim 12 further comprising the step of providing stability analysis results to an output interface.

17. The method of claim 12 further comprising the step of comparing the calculated exerted torques with the torque capacities along a first plane to analyze two dimensional stability of the structure.

18. The method of claim 17 further comprising the step of comparing calculated exerted torques with the torque capacities along a second plane orthogonal to the first plane to analyze three dimensional stability of the structure.

19. The method of claim 12 in which the step of assigning further includes calculating the torque capacity for each joint.

20. The method of claim 12 in which the bodies are stronger than the joints.

21. A computer apparatus for analyzing stability in a structure formed from multiple components fastened together comprising:

a representing member for representing the structure as a series of bodies fixed in place by stationary joints;

a listing member responsive to the representing member for listing the joints, the joints having known properties;

an assigning member coupled between the representing member and the listing member, the assigning member for assigning a torque capacity to each joint corresponding to the known properties;

a calculating member coupled to the representing member for calculating forces exerted on the bodies; and an analysis member for comparing (i) torques exerted on the joints based on the calculated forces, and (ii) the torque capacities, to determine stability of the structure.

22. The apparatus of claim 21 further comprising a table accessed by the assigning member for providing the torque capacity for each joint, the table containing indications of torque capacities for known joint properties.

23. The apparatus of claim 21 in which at least one of the bodies is fixed to ground with at least one of the stationary joints.

24. The apparatus of claim 21 further comprising an input interface for providing parameters of the structure.

25. The apparatus of claim 21 further comprising an output interface for providing stability analysis results to a user.

26. The apparatus of claim 21 further comprising a model generating member for generating a model of the structure based on parameters entered by a user.

27. The apparatus of claim 21 in which the calculated exerted torques are compared with the torque capacities along a first plane to analyze two dimensional stability of the structure.

28. The apparatus of claim 27 in which the calculated exerted torques are compared with the torque capacities along a second plane orthogonal to the first plane to analyze three dimensional stability of the structure.

29. The apparatus of claim 21 in which the bodies are stronger than the joints.

* * * * *